US006529883B1

(12) United States Patent
Yee et al.

(10) Patent No.: US 6,529,883 B1
(45) Date of Patent: Mar. 4, 2003

(54) PREPAYMENT ENERGY METERING SYSTEM WITH TWO-WAY SMART CARD COMMUNICATIONS

(75) Inventors: David Moon Yee, Scottsdale, AZ (US); Robert Henry Bickley, Paradise Valley, AZ (US); Philip John Zucarelli, Glendale, AZ (US); Theodore Woolley Keller, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/378,357

(22) Filed: Aug. 20, 1999

(51) Int. Cl.[7] .............................................. G06F 17/60
(52) U.S. Cl. ......................... 705/63; 705/400; 705/401
(58) Field of Search ........................... 705/17, 63, 400, 705/412

(56) References Cited

U.S. PATENT DOCUMENTS

| | | | |
|---|---|---|---|
| 4,240,030 A | * 12/1980 | Bateman et al. | 324/110 |
| 4,351,028 A | * 9/1982 | Peddie et al. | 700/286 |
| 4,404,521 A | 9/1983 | Fennel | |
| 4,470,711 A | 9/1984 | Brzozowski | |
| 4,505,530 A | 3/1985 | Fennel | |
| 4,615,113 A | 10/1986 | Fennel | |
| 4,698,655 A | 10/1987 | Schultz | |
| 4,731,575 A | 3/1988 | Sloan et al. | 324/113 |
| 4,803,632 A | * 2/1989 | Frew et al. | 705/412 |
| 5,146,067 A | 9/1992 | Sloan et al. | 235/381 |
| 5,450,007 A | * 9/1995 | Payne et al. | 324/141 |
| 5,986,574 A | 11/1999 | Colton | |

6,300,881 B1    10/2001    Yee et al.

FOREIGN PATENT DOCUMENTS

| | | | |
|---|---|---|---|
| EP | 0250202 | * 12/1987 | |
| GB | 2208955 | 4/1989 | G07F/7/08 |
| JP | 09-007039 | * 1/1997 | |

OTHER PUBLICATIONS

American Banker: "Diebold, CIC Creating Electricity Card System"; Mar. 24, 1998.*
Times of India: "Pre–Paid energy card meters developed"; Mar. 20, 2000.*

* cited by examiner

Primary Examiner—Edward R. Cosimano
(74) Attorney, Agent, or Firm—Gregory J. Gorrie; Frank J. Bogacz

(57) ABSTRACT

A pre-payment energy metering system uses two-way smart card communications. Secure power line carrier communications are provided at the consumer locations communication between a customer terminal and the utility meter. Two-way secure communication of data is provided through the use of a smart card or memory card which conveys data from the utility service provider to the customer's terminal and also conveys information from the customer's terminal back to the utility. The pre-payment power system of the present invention allows consumers to pay for electricity prior to consumption through the use of the smart card which is loaded with funds at a fully automatic point-of-sale (POS) terminal or at the utility service providers staffed customer service center. Back office software interfaces between the POS terminals and customer service centers, and utility service providers customer information systems.

22 Claims, 2 Drawing Sheets

PREPAYMENT ENERGY METERING SYSTEM WITH TWO-WAY SMART CARD COMMUNICATIONS

FIELD OF THE INVENTION

This invention relates to prepayment utility meter systems, and more particularly to a more secure method and apparatus for communicating information between utility sales locations to customer sites using smart cards.

BACKGROUND OF THE INVENTION

Utility companies have traditionally performed reading and rendering bills for collecting for electric, gas, and water or other utility services after such services have been used by a customer. More recently, prepayment utility metering systems have been proposed as a way for overcoming some of the shortcomings of traditional billing systems. These prepayment systems were designed so that the purchase of a supply of electricity, gas, or water is made at a central station such as the gas or electric utility office, and the information regarding the amount of the purchase is then communicated to the customer site where the utilities are consumed. At the customer site a metering device is installed which is designed to receive the prepayment communication information, and credit the user with the amount purchased at the central site. These types of proposed prepayment metering systems may reduce meter reading expenses, bad debt collection, account transfer expenses and credit department expenses, and may providing a greater awareness on the consumer's consumption habits.

One of the problems with these prepayment utility systems is that they are difficult and costly to install. Typically the electric metering device is installed on an outside of a consumer or business location and a terminal which reads the prepayment information is either located with the meter or coupled by a cable to the meter and located inside. Installation requires routing the cable through the building. This is time consuming and expensive and in the case of existing consumer residences may require the consumer to be at home which is a further inconvenience and expense.

Another problem with typical prepayment utility systems is that they do not provide for communication of information back to the utility service provider. With these typical prepayment systems, an amount of credit is issued to a consumer and at the customer site. A customer terminal receives the credit and reduces the credit as the utility is consumed. The utility service provider has no way of knowing anything about the consumption at the consumer location. The utility service providers only know that a customer requests more credit and issues the credit to the consumer. For example the utility service provider does not know how the consumer is using that credit, where or on what utility meter the customer is using that credit, and also may be unaware of any remaining credit that exists on consumers cards. Furthermore the utility service provider has no way of knowing if there has been tampering with these cards.

Accordingly, what is needed is a prepayment energy metering system that is easier and less expensive to install in existing consumer locations. What is also needed is a prepayment energy metering system that provides information back to the utility service provider.

U.S. Pat. No. 5,146,067 entitled "Prepayment Metering System Using Encoded Purchase Cards From Multiple Locations", and U.S. Pat. No. 4,731,575 entitled "Prepayment Metering System Using Encoded Purchase Cards" disclose prepayment metering systems and are hereby incorporated by reference.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment. of the invention in one form thereof, and such exemplification is not intended to be construed as limiting in any manner.

DETAILED DESCRIPTION OF THE INVENTION

The present invention, among other things, provides a prepayment energy metering system with two-way smart card communications. In accordance with the preferred embodiment the prepayment energy metering system reduces installation costs by providing at the consumer locations communication between a customer terminal and the utility meter over existing power lines. Furthermore, and in accordance with the preferred embodiments of the present invention, two-way communication of data is provided through the use of a smart card or memory card which conveys data from the utility service provider to the customer's terminal and also conveys information from the customer's terminal back to the utility. The prepayment power system of the present invention allows for the payment of a utility, such as electricity, prior to consumption through the use of a smart card. The smart card is loaded with funds preferably at a fully automatic point-of-sale (POS) terminal or at a utility service providers staffed customer service center. Back office software interfaces between the POS terminals, the customer service centers, and the utility service providers customer information systems. Although the present invention is described in the preferred embodiment for electric utility services, it is equally suitable for other utilities, such as water, gas, etc.

Figure 1:
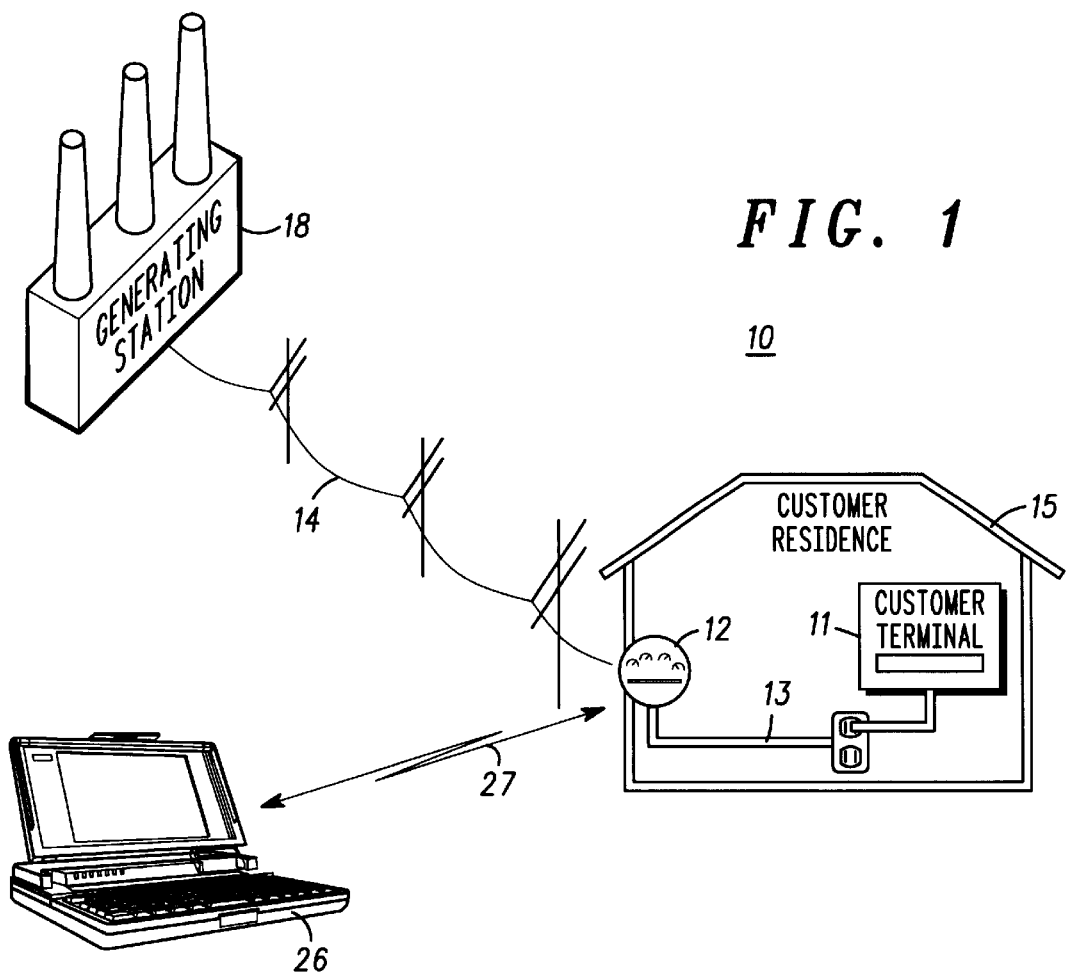
FIGS. 1 & 2 illustrate a simplified diagram illustrating a prepayment energy metering system in accordance with a preferred embodiment of the present invention.
Figure 2:
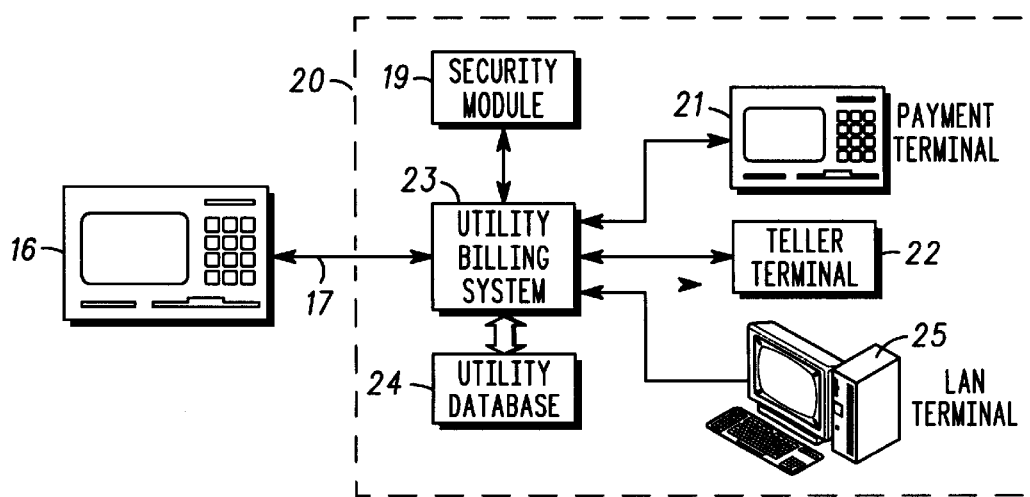

FIGS. 1 & 2 illustrate a simplified diagram of a prepayment energy metering system in accordance of a preferred embodiment of the present invention. As shown in FIGS. 1 & 2, customer residence 15 receives electricity from generating station 18 over power lines 14 at utility meter 12. Utility meter 12 is coupled by power lines 13 within the consumer residence to customer terminal 11. Customer terminal 11 receives power from an electric outlet within consumer residence 15 and communicates with utility meter 12 over electric lines 13 within the consumer residence. Accordingly the power connection for consumer terminal serves two purposes: providing power to consumer terminal and providing a communication path with utility meter 12.

FIGS. 1 & 2 also illustrate service terminal 26 which is used by a service technician to diagnose, among other things, utility meter 12 and update software in utility meter 12 and customer terminal 11. Link 27 may be an infrared link, a direct cable connection or an RF link, or alternatively be implemented via a power line carrier communications.

Prepayment energy metering system preferably includes point-of-sale (POS) terminals such as automatic teller machine (ATM) 16 and payment terminal 21 which may be located within a utility office, or utility service provider's office building 20. ATM 16, prepayment terminal 21 and teller terminal 22 interface with the utilities billing system 23 which keeps track of consumers accounts and information stored in the utility data base 24. Connection 17 is an interface between ATM 16 and utility billing system 23.

Security module 19 provides security for communications between utility billing system 23 and utility data bases 24. Security module 19 also provides security for transactions with communication cards for communications with utility meters. Preferably, encryption and decryption functions are provided by security module 19 which, for example, include key management for public and private keys. Security module 19 also provides the encryption and signature information written on the communication cards. Security module 19 also provides for decryption and validation of information communicated via the communication cards between and meters and the utility.

Service terminal 26 is comprised of a computer system, which is a primary tool for a service technician for installing, servicing, calibrating and communicating with utility meters 12. The service terminal 26 reads and writes data items from a memory device such as a disk. The service terminal, among other things, retrieves transaction history and meter health information from utility meter 12 and can store this information on its disk. The information on this disk may be transferred to the utility service provider either by coupling the service terminal directly to the utilities information systems or by communicating over a LAN or Internet type of system. LAN terminal 25 may be used for this purpose. In accordance with the preferred embodiment of the present invention, an access pass is issued when a service technician receives a work order. The access pass preferably remains valid for a predetermined period of time to limit the time period available to access a meter. The access pass is preferably digitally signed with a system private key. This reduces risk of a lost or stolen service terminal and reduces system vulnerability to theft of services. The access pass is consumed when a service technician logs onto a particular utility meter. In another embodiment, the access pass preferably comprises a sequential number and an expiration date, both of which are signed digitally with the systems private key. The utility meter stores the sequential number and verifies that this number, among other things, is greater than a previously used access number. Other security measures may also be included for service terminal access and communications with the meter. The service unit enables a service technician to read or change a meter's identification number, a prepayment identifier, a utility account number and rate tables. Additionally, the service terminal enables the service technician to change credit on the meter, switch on or off the meter, read kilowatt consumption, calibrate the meter, change the meter's mode from prepayment mode to non prepayment mode, read tamper information from the meter, etc. Service terminal 26 also allows a service technician to place the meter into clone mode which is used for replacement of a meter.

ATM 16 accepts, reads and writes data to and from a communication card specified for the utility metering system as instructed by back office software. ATM 16 accepts dollar amounts provided by the ATM and communicates this transaction back to the utility service provider upon approval by back office software. The information is written back to the communication card, preferably with the security features discussed above. A customer information manager coupled with utility billing system 23 provides for the administrative functions of the system and provides access authorization by password and preferably retains a record of system access.

In the alternate utility embodiments, meter 12 is, for example, a gas meter or water meter, or other utility meter coupled by a link to customer terminal 11. In this embodiment, the link may be any suitable link such as an RF link, a power line carrier link or a combination thereof.

Figure 3:
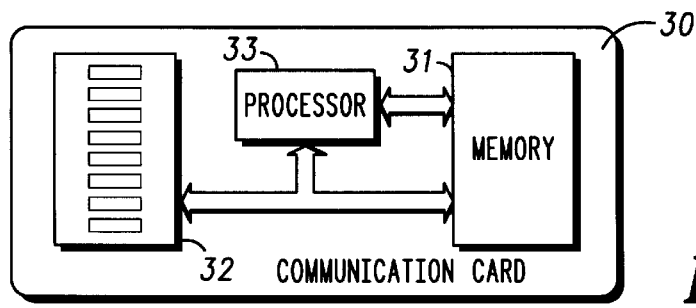
FIG. 3 illustrates a simplified functional block diagram of a communication card suitable for use in accordance with the preferred embodiment of the present invention.

FIG. 3 illustrates a simplified functional block diagram of a communication card 30 suitable for use in accordance with a preferred embodiment of the present invention. Communication card 30 provides for two-way communication of information, for example between utility office 20 (FIG. 2) and meters 11 (FIG. 1). Communication card 30 comprises a memory element 31 and interface element 32 coupled to memory element 31. This communication card may be a commercially available memory card or smart card and is preferably of a size and shape consistent with common credit cards. In accordance with the preferred embodiment of the present invention, the card is of format ISO 7816-1 and 2, and may also be a memory only type card described by ISO 7816-3 through 7816-6. Preferably, interface element 32 has gold contacts for interfacing with a card reader and preferably includes a bus type connection to memory element 31 comprised of bus lines. In accordance with the preferred embodiment of the present invention, the lines include a clock line, a data line, a power line and a ground line. Two way data transfer is accomplished preferably through the use of one data line. Memory element 31 is preferably comprised of a semiconductor memory chip such as flash memory or EE PROM. However, other types of memory are suitable.

In accordance with another embodiment of the present invention, communication card 30 additionally comprises processing element 33.

Figure 4:
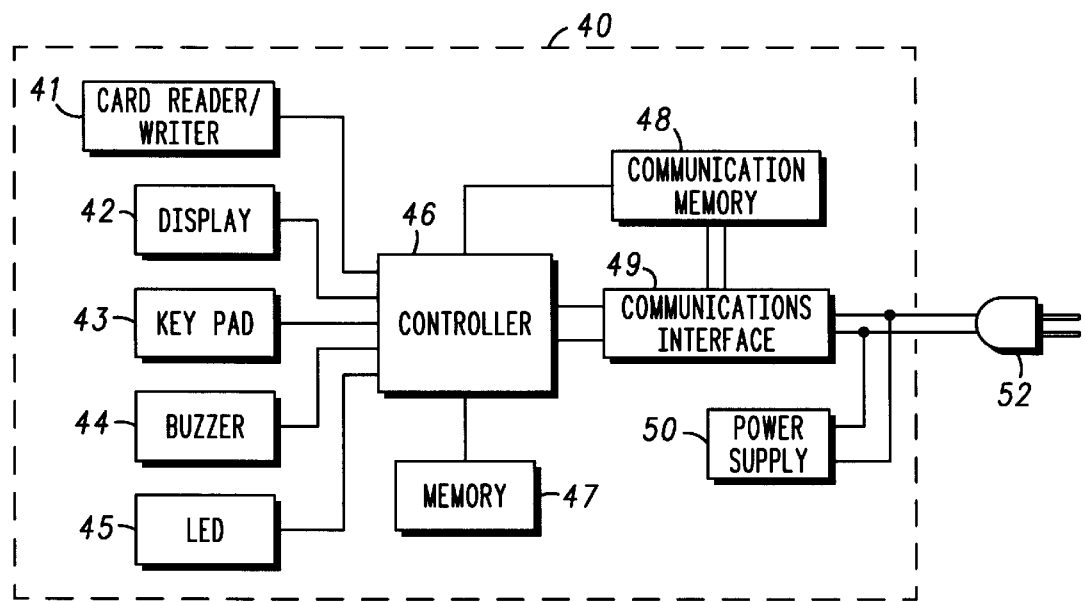
FIG. 4 illustrates a simplified functional block diagram of a customer terminal in accordance with a preferred embodiment of the present invention.

FIG. 4 illustrates a simplified functional block diagram of customer terminal 40 in accordance with a preferred embodiment of the present invention. Customer terminal 40, for example, is suitable for use for customer terminal 11 (FIG. 1). Customer terminal 40 includes card reader and card writer element 41, which accepts cards such as communication card 30 described in FIG. 3. Card reader and writer element 41 provides information to and from communication card from controller 46. Customer terminal 40 is preferably suitable for wall mounting by a homeowner, or alternatively, placement on a flat horizontal surface. Externally, display 42, keypad 43, visual warning 45 and a card reader slot associated with card reader and writer 41 are accessible to the consumer. When a communication card is inserted into card reader and writer 41, the data is transferred to controller 46, modulated and packetized by communications interface 49 and transmitted to a utility meter via power line carrier communications. Communications interface 49 preferably provides for power line signaling in accordance with appropriate communications regulations, for example, FCC Sec. 15.107 entitled "Limits for Current Carrier Systems". An IP address is specified for the meter so that the appropriate meter is addressed. Communications memory 48 stores specific information required for the power line communications and addressing the particular meter.

Communications interface 49 also receives data over power line from the meter, demodulates and depacketizes the data, transfers the information to controller 46 which may write it to a communication card which may be inserted in card reader/writer element 41. In accordance with the preferred embodiments of the present invention, some data communicated with the meter may be in encrypted form or signed. Information from an inserted communication card and information received over the power line carriers from the meter may also be displayed on display 42. This is discussed below.

A re-chargeable battery, not shown, preferably provides a backup power supply in the event power supply 50 is not coupled with electricity, for example in the case when electricity is turned off at the consumer residence and is not available through plug 52. In this manner, a consumer terminal may be used to switch on electricity even though electricity is not present at the consumer terminal. Additionally, when power is turned off at the meter switch, the rechargeable battery supplies power to communicate with the meter. Buzzer 44 and LED 45 provide a consumer with a warning, for example, when power may be turned off for various reasons, or may indicate other problems with the customer terminal or meter, including when the battery may become discharged. Memory 47 stores messages and provides among other things for buffering for controller 46 and may also include stored application programs in a non-volatile portion of memory. Although memory 47, controller 46, communications memory 48 and communications interface 49 are shown as separate functional elements, it is understood that they may be combined in one or more elements comprised of both hardware and software.

Figure 5:
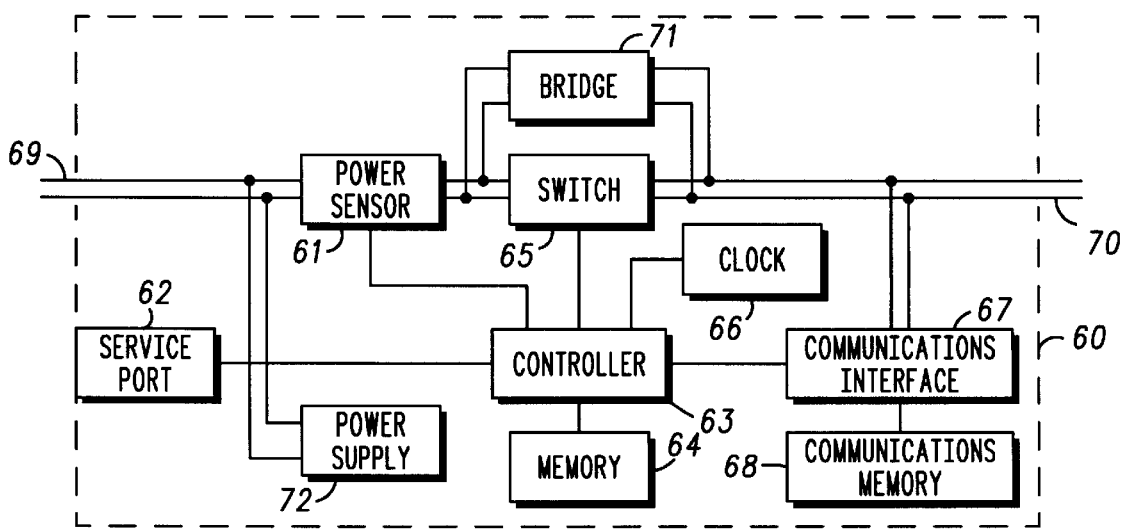
FIG. 5 illustrates a simplified functional block diagram of an electric utility meter in accordance with a preferred embodiment of the present invention.

FIG. 5 illustrates a simplified functional block diagram of meter 60 in accordance with the preferred embodiment of the present invention. Meter 60, for example, is suitable for use for meter 12 (FIG. 1). Meter 60 includes power sensing element 61, disconnect switch 65, service port 62 and communications interface 67 coupled to a controller 63. Service port 62 is preferably an ANSI type two optical port for communicating with service units or service terminals discussed above. Communications interface 67 provides for communications over an electric power line with consumer terminals, such as consumer terminal 40 illustrated in FIG. 4.

Data received over power lines 70 which are internal to a consumer residence are demodulated and depacketized by communications interface 67 in accordance with the information stored in communications memory 68. Preferably, the packetized data has an IP address associated with the particular meter. Controller 63 receives data in parallel form from communications interface 67 preferably in 12 byte packets and may store this data in memory 64. Controller 63, among other things, decrypts the data in accordance with decryption techniques and preferably uses a key unique to the meter. Controller 63 also verifies a signature associated with the information. In accordance with the preferred embodiment of the invention, the data was previously signed by the utility service provider when stored on the communication card. The signature is preferably verified with a public key of the utility stored in a memory such as memory 64. The received data preferably includes a transaction ID which is checked by controller 63 with prior transaction ID's and determines if this data has been acted upon previously. If the data has already been acted upon, controller 63 may determine this to be an invalid transaction and store this information back to the communication card or provide this information to the consumer using display 42, for example. Once the data has been decrypted and signatures verified, controller 63 may also match the account number and consumer ID from the card with information stored in memory 64 and when this information matches, the information such a dollar credit amount may be credited to the meter and stored in memory 64.

In accordance with the preferred embodiments of the present invention, a card identifier, account number, utility ID, consumer name, consumer ID and meter location ID are all stored on the communication card and digitally signed. This information may be stored in encrypted form. In accordance with the preferred embodiment of the present invention, a digital certificate is also stored on the card and transferred from the back office to the meter which is used to validate the keys. Additionally, two public keys and public key dates are provided on the communication card and transferred to the meter. The public keys are preferably encrypted and signed and the dates indicate the effective date upon which these keys should be used. Rate schedules, public key ID, point-of-sale ID, and other information may also be provided on the communication card.

In accordance with the preferred embodiment of the present invention, consumer data and transaction data which include a balance amount are stored on the communication card and signed. A utility rate schedule may also be provided, and implemented by the meter. In accordance with the preferred embodiment of the present invention, an advertising block of information is also provided on the communication card. This is discussed in more detail below.

Controller 63 also provides information for transmission back to a customer terminal 40. This information preferably comprises a meter read-time clock stamp, a total kilowatt hours consumed, an amount of remaining credit which is preferably encrypted, a meter health block which includes tamper information, a list of the last five transactions, and includes any loss of power events. This information also may include a key status indicating which key is being used. This entire block of information is preferably signed with a digital signature for verification at the back office.

In addition to information sent to the back office via the communication card, meter 60 also transmits information for displaying at consumer terminal 40. Information sent from the meter to the customer terminal for display is preferably sent in clear form and not encrypted. In accordance with the preferred embodiment of the present invention, a standard display message is sent on a regular basis, for example, every ten minutes, or alternatively the consumer terminal may request a message. The information in the display message may include current instantaneous electricity consumption, an amount consumed during the last month or the last day or month to date information which may be both in dollar amounts or kilowatt hour amounts. The display information also may include the amount of dollars remaining and the number of days remaining based on prior usage and the amount of credit available. The display information is stored in memory 64, packetized and modulated through communications interface 67, transmitted over internal power line 70 and received by customer terminal 40. Coding in the display data indicates that the display information is for displaying and furthermore indicates an IP address associated with the particular customer terminal 40.

Clock 66 is preferably a real-time clock, which may use the 60 Hz present on the electric line, or an internal crystal when power is not available. A similar clock may alternatively be located in customer terminal 40. Although not shown, clock 66 is preferably coupled to a rechargeable battery for backup when power is not available. Switch 65 is preferably a 200 amp relay controlled by controller 63. Communication data bridge 71 provides for data communication when switch 65 is open. Power sensor 61 is coupled to power lines 14 via leads 69 and provides, among other things, instantaneous and average power meaurements while controller 63 stores the cumulative power, remaining power credit, historical power consumption, in non-volatile memory portion of memory 64. Controller 63 provides a verification for operation of switch 65, provides this feedback upon request to a requesting service technician through service port 62, for example. Meter power supply 72 provides energy to meter components, including when switch 65 is open.

Thus a prepayment energy communication has been described having advantages over existing prepayment energy metering systems. In accordance with the preferred embodiments of the present invention, the prepayment energy metering communication system reads a first data set from a communication card at a first consumer terminal. The first data set, among other things, includes a digital signature, an amount of credit, a meter identifier and a transaction identifier. The consumer terminal formats the first data set into packetized data and transfers the formatted first data set over a power line carrier to a utility meter. The utility meter verifies the digital signature, the transaction identifier and the meter identifier and stores the amount of credit in the utility meter.

Additionally, the utility meter provides a second data set, and packetizes and transfers this data over the power line carrier to the customer terminal. The second data set comprises power measurement data, meter read time data, remaining credit amounts and a second digital signature. The customer terminal depacketizes the second data and transfers the second data onto a communication card. The utility service provider is provided this information when the communication card is inserted into an ATM or payment terminal, for example, as discussed above.

Although the preferred embodiment of the invention has been illustrated, and that form described in detail, it will be readily apparent to those skilled in the art that various modifications may be made therein without departing from the spirit of the invention or from the scope of the appended claims.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A prepayment energy metering communication method comprising the steps of:

reading from a communication card at a customer terminal a first data set, the first data set comprising a digital signature, a credit amount, a meter identifier, and a transaction identifier;

the customer terminal formatting the first data set into first packetized data and transferring the formatted first data set over a power line carrier to a utility meter;

the utility meter verifying said digital signature, the transaction identifier and the meter identifier;

storing said credit amount in the utility meter;

the utility meter formatting a second data set into second packetized data and transferring the formatted second packetized data set over the power line carrier to the customer terminal, the second data set comprising power measurement data; a meter read time; a remaining credit amount, and a second digital signature;

the customer terminal depacketizing the second packetized data set and transferring the second data set onto the communication card.

2. The method as claimed in claim 1 further comprising the step of the utility meter digitally signing at least a portion of the second data set to produce the second digital signature.

3. The method according to claim 1 wherein the power measurement data of the second data set further comprises a cumulative power consumption measurement, a meter read time, and a key status.

4. The method according to claim 1 wherein the communication card is comprised of semiconductor memory and a plurality of external electrical contacts, and wherein the reading step, the first data set is provided through at least one of the external electrical contacts, and wherein the transferring the second data set onto the communication card step further comprises the step, the second data set is provided through said at least one of the external electrical contacts.

5. The method according to claim 1 further comprising the steps of reading the second data set from the communication card by an automated teller machine (ATM) and the ATM transferring second data set to the utility service provider, said ATM accepting a credit amount, communicating the credit amount with the utility service provider, receiving an updated first data set, and writing the updated first data set to the communication card.

6. The method according to claim 1 wherein the reading step includes the step of reading advertising data stored on the communication card, and wherein the method further includes the step of displaying said advertising data at the consumer terminal in response to the reading step.

7. The method as claimed in claim 1 wherein the verifying the transaction identifier step comprises the step of the utility meter comparing the transaction identifier with prior transaction identifiers and wherein the method further comprises the step of refraining from performing the storing the credit amount step when the transaction identifier compares with one of the prior transaction identifiers.

8. The method according to claim 1 further comprising the steps of the utility meter monitoring electricity consumption, and decrementing the remaining credit amount in accordance with rate tables stored in the meter and the electricity consumption.

9. The method according to claim 8 wherein the first data set further comprises new rate information, and wherein the storing step further comprises the step of storing the new rate tables in the utility meter, and wherein the method further comprises the step of the utility meter decrementing the remaining credit amount in accordance with the electricity consumption and the new rate tables.

10. The method as claimed in claim 1 wherein further comprising the steps of the utility meter monitoring electricity consumption rate, decrementing the remaining credit amount in accordance with rate information and the electricity consumption rate, and calculating an estimated time remaining based on prior electricity consumption, and wherein the customer terminal further comprises a display, and wherein the method further comprises the steps of the utility meter transmitting a third data set over the power line carrier to the customer terminal for displaying on the display, the third data set comprising the remaining credit amount, the electricity consumption rate and the estimated time remaining.

11. A method as claimed in claim 10 wherein the reading step includes the step of reading advertising data stored on the communication card, storing the advertising data in the utility meter and including the advertising data in said third data set for displaying at the consumer terminal.

12. The method as claimed in claim 10 wherein the transmitting the third data set step is performed at least on a regular basis, the regular basis being at least once every fifteen minutes, and wherein the method further comprises the step of transmitting the third data set in response to changes in the electricity consumption rate.

13. The method as claimed in claim 10 wherein the customer terminal further comprises an input/output device for receiving input from a user, and wherein the transmitting the third data set step is performed in response to input from the user.

14. The method as claimed in claim 1 wherein the communication card comprises memory means for storing digitally signed fixed data, the fixed data comprising an account number, a utility service provider identifier, a customer identifier, and the meter identifier, and wherein the method further comprises the step of a utility service provider digitally signing the fixed data with a private key of the utility service provider, and storing said digitally signed fixed data on the communication card.

15. The method as claimed in claim 14 wherein the utility service provider digitally signs the fixed data with a private key of the utility service provider, and wherein the method further comprises the step of the utility meter verifying the signature of the digitally signed fixed data with a public key of the utility service provider, the public key being stored in the utility meter.

16. The method as claimed in claim 15 wherein the first data set further comprises a certificate containing the public key of the utility service provider, and wherein the method further comprises the step of the meter verifying a digital signature of the certificate.

17. The method as claimed in claim 16 wherein the first data set further comprises an effective date associated with the public key of the utility service provider, and wherein the method further comprising the steps of storing the public key and the effective date in a memory of the utility meter, and wherein the verifying the signature of the digitally signed fixed data step is performed with said public key of the utility service provider after the effective date.

18. The method as claimed in claim 4 wherein the public key of the utility service provider is a first public key, and wherein the first data set further comprises a second public key, and first and second effective dates associated respectively with the first and second public keys of the utility service provider, and wherein the method further comprises the steps of storing the first and second public keys and associated effective dates in a memory of the utility meter, and wherein the verifying the signature of the digitally signed fixed data step is performed with the first public key prior to the second effective date and the second public key after the second effective date, and wherein the first and second public keys are stored on the communication card in encrypted form.

19. A prepayment energy metering communication system comprising:

a customer terminal; and a utility meter, wherein the customer terminal comprises:
    a communication card reader for reading from a communication card a first data set, the first data set comprising a digital signature, a credit amount, a meter identifier, and a transaction identifier;
    a terminal controller; and
    a terminal communications interface for formatting the first data set into first packetized data and transferring the formatted first data set over a power line carrier to the utility meter, wherein the utility meter comprises:
    a meter controller for verifying said digital signature, the transaction identifier and the meter identifier;
    a memory for storing said credit amount; and
    a meter communications interface for formatting a second data set into second packetized data and transferring the formatted second packetized data set over the power line carrier to the customer terminal, the second data set comprising power measurement data, a meter read time, a remaining credit amount, and a second digital signature,
    wherein the terminal communications interface receives and depacketizes the second packetized data set and the terminal controller transfers the second data set onto the communication card.

20. The system as claimed in claim 19 wherein the utility meter further comprises clocking circuitry having means for providing a clock signal to the meter controller, the clocking circuitry using an A/C cycle rate when A/C power is available to provide the clock signal, the clocking circuitry using a crystal to provide the clock signal when AC power is not available.

21. A system as claimed in claim 20 wherein the communication card comprises electronically erasable programmable read only memory (EEPROM) and a plurality of contacts for communicating clock, ground, power and data signals.

22. A method of communicating data using a smart cart comprising the steps of:

storing a digital signature, a credit amount, a meter identifier, and a transaction identifier on the smart card;

transferring the digital signature, the credit amount, the meter identifier, and the transaction identifier to a utility meter using power line carrier communications;

storing utility consumption information on the smart card from the utility meter; and transferring the utility consumption information from the smart card to a service provider.

* * * * *